(No Model.)
G. WESTINGHOUSE, Jr.
BRAKE APPARATUS FOR SIX WHEELED TRUCKS.
No. 415,595. Patented Nov. 19, 1889.
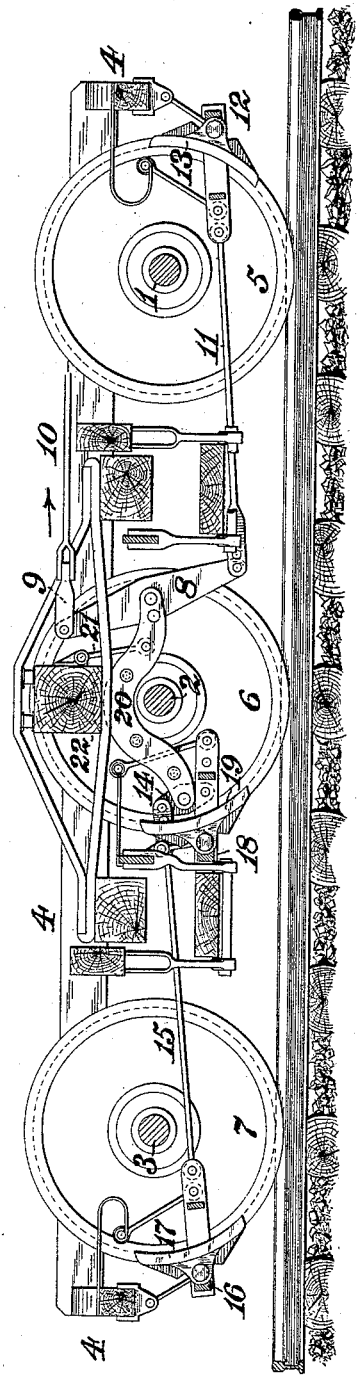
WITNESESS:
INVENTOR.

UNITED STATES PATENT OFFICE.

GEORGE WESTINGHOUSE, JR., OF PITTSBURG, PENNSYLVANIA.

BRAKE APPARATUS FOR SIX-WHEELED TRUCKS.

SPECIFICATION forming part of Letters Patent No. 415,595, dated November 19, 1889.

Application filed August 26, 1889. Serial No. 321,941. (No model.)

*To all whom it may concern:*

Be it known that I, GEORGE WESTINGHOUSE, Jr., a citizen of the United States, residing at Pittsburg, in the county of Allegheny and State of Pennsylvania, have invented or discovered a certain new and useful Improvement in Brake Apparatus for Six-Wheeled Trucks, of which improvement the following is a specification.

The object of my invention is to enable the application of brake-shoes to be made with a regulated force to each pair of wheels of a six-wheeled truck, in order that the braking-power applied in a car supported upon trucks of such construction may bear the same proportion to the total weight of the car, as in the case of the ordinary four-wheeled trucks.

To this end my invention, generally stated, consists in the combination of a floating lever coupled at opposite ends to a pull-rod and to the brake-beam of one of the end pairs of wheels of a six-wheeled truck, respectively, a floating lever coupled at opposite ends to the brake-beams of the center and of the other end pair of wheels, and a connecting-bar coupling the centers of the floating levers one to the other.

The improvement claimed is hereinafter fully set forth.

The accompanying drawing is a vertical longitudinal central section through a six-wheeled car-truck embodying my invention.

My improvement is herein illustrated as applied in a car-truck having three axles 1 2 3, fitted with pairs of wheels 5, 6, and 7, respectively, and having journals which rotate in boxes in a truck-frame 4 of the usual construction.

In the practice of my invention I provide a floating lever 8, the upper end of which is coupled by a link the end pins of which are set at right angles one to the other, so as to form a universal joint to a pull-rod 10, the opposite end of which is coupled, through suitable connections in the usual manner, to the actuating member of the brake mechanism of the car, which is ordinarily the piston of a fluid-pressure-brake cylinder. The lower end of the lever 8 is coupled by a pull-rod 11 to a brake-beam 12, carrying the brake-shoes 13 of the pair of wheels 5 at one end, in this instance the right-hand end of the truck. The lever 8 is coupled at its center to one end of a connecting-bar 20, which is curved from its center to each end to clear the center axle 2, and is suspended by a hanger 21 from the center bearing-beam 22 of the truck. The bar 20 is preferably formed of two side plates connected by bolts and maintained at a proper distance apart to form end jaws by interposed thimbles or distance-pieces. The opposite end of the connecting-bar 20 is coupled to the center of a floating lever 14, having arms of shorter length than those of the lever 8, the upper end of the lever 14 being coupled by a pull-rod 15 to the brake-beam 16, carrying the brake-shoes 17 of the pair of wheels 7 at the other or left-hand end of the truck. The lower end of the lever 14 is coupled directly to an arm on the brake-beam 18, which carries the brake-shoes 19 of the wheels 7 of the center axle of the truck.

While I have shown a construction in which an equal degree of braking-pressure is applied to the brake-shoes of each pair of wheels, it will be obvious that the pressure may, if desired, be regulated so as to be applied in different degrees to the several pairs.

In operation draft upon the pull-rod 10 in the direction of the arrow first applies the brake-shoes of the right-hand end pair of wheels 5 through the lever 8 and pull-rod 11, the lever 8 moving about its connection with the bar 20 as a fulcrum and imparting to the brake-shoes a braking-pressure equal to that exerted on the pull-rod. The lever 8 then moves about its connection with the pull-rod 11 as a fulcrum and transmits double the braking-pressure applied to the pull-rod 10 to the lever 14 through the connecting-bar 20, by which it is coupled to said lever, the lever now acting with a power-arm of twice the length of its resistance-arm. The lever 14, moving about its connection with the arm of the brake-beam 19 as a fulcrum, then applies the brake-shoes 17 of the opposite end pair of wheels 7, such application imparting to the brake-shoes 17 a braking-pressure which is one-half that applied to the connecting-bar 20—that is to say, is equal to that exerted on the primary pull-rod 10—the pressure being transmitted from the bar 20 to the pull-rod 15 through a power-arm on the lever 14, which is one-half the length of the resistance-arm thereof. The continued draft of the bar 20 causes the lever 14 to move about its connection with the pull-rod 15 as a fulcrum, and to thereby apply the brake-shoes 19 of the center pair of wheels 6, such application being made, as before, through a power-arm one-half the length of the resistance-arm, and consequently applying a braking-pressure of one-half that applied to the bar 20—that is to say, equal to that applied to the primary pull-rod 10 and to the brake-shoes of the other two axles of the truck.

I claim as my invention and desire to secure by Letters Patent—

In a brake apparatus for a six-wheeled truck, the combination of a floating lever coupled at opposite ends to a pull-rod and to the brake-beam of one of the end pairs of wheels, a floating lever coupled at opposite ends to the brake-beams of the center and of the other end pair of wheels, and a connecting-bar coupling said floating levers centrally one to the other, substantially as set forth.

In testimony whereof I have hereunto set my hand.

GEO. WESTINGHOUSE, JR.

Witnesses:
W. D. UPTEGRAFF,
J. SNOWDEN BELL.